(12) United States Patent
Ritacco

(10) Patent No.: US 6,324,719 B1
(45) Date of Patent: Dec. 4, 2001

(54) AUXILIARY VEHICLE WINDSHIELD WIPER APPARATUS

(76) Inventor: Richard V. Ritacco, 42 Howe Ave., Nutley, NJ (US) 07110

( * ) Notice: Subject to any disclaimer, the term of this patent is extended or adjusted under 35 U.S.C. 154(b) by 0 days.

(21) Appl. No.: 09/497,931

(22) Filed: Feb. 4, 2000

(51) Int. Cl.[7] .................................. B60S 1/24; B60S 1/16
(52) U.S. Cl. ............................................................ 15/250.3
(58) Field of Search ............................. 15/250.3, 250.31, 15/250.001, 250.351, 250.19

(56) References Cited

U.S. PATENT DOCUMENTS

| D. 370,653 | 6/1996 | Kim . | |
|---|---|---|---|
| 2,031,297 | 2/1936 | Anderson . | |
| 2,102,268 | * 12/1937 | Hopperstard | 15/250.3 |
| 2,944,277 | * 7/1960 | Ochello et al. | 15/230.3 |
| 3,448,480 | 6/1969 | Couget . | |
| 3,978,542 | 9/1976 | Van Eekelsen et al. . | |
| 4,027,354 | * 6/1977 | Burpee | 15/250.3 |
| 4,316,303 | 2/1982 | Penn . | |
| 5,274,876 | * 1/1994 | Wehrspan | 15/250.351 |
| 5,410,774 | 5/1995 | Adams . | |

FOREIGN PATENT DOCUMENTS

| 866309 | * | 2/1953 | (DE) | 15/250.3 |
|---|---|---|---|---|
| 2439996 | * | 3/1976 | (DE) | 15/250.3 |
| 2913635 | * | 7/1980 | (DE) | 15/250.3 |
| 601905 | * | 3/1926 | (FR) | 15/250.3 |
| 296498 | * | 3/1932 | (IT) | 15/250.3 |

* cited by examiner

Primary Examiner—Gary K. Graham

(57) ABSTRACT

A auxiliary vehicle windshield wiper apparatus for acting as a back-up windshield wiper system during times of windshield wiper failure. The auxiliary vehicle windshield wiper apparatus includes a housing. A reciprocating motion assembly is mounted in the housing. A wiper assembly comprises an arm portion and a wiper. The arm portion has a first end and a second end. The first end of the arm portion is mounted on the reciprocating motion assembly. A wiper for wiping the windshield of the car is fixedly coupled to the second end of the arm portion. A securing means releasably secures the housing to the windshield.

1 Claim, 2 Drawing Sheets

AUXILIARY VEHICLE WINDSHIELD WIPER APPARATUS

BACKGROUND OF THE INVENTION

1. Field of the Invention

The present invention relates to windshield wipers and more particularly pertains to a new auxiliary vehicle windshield wiper apparatus for acting as a back-up windshield wiper system during times of windshield wiper failure.

2. Description of the Prior Art

The use of windshield wipers is known in the prior art. More specifically, windshield wipers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,978,542; 4,316,303; 3,448,480; 5,410,774; 2,031,297; and U.S. Pat. No. Des. 370,653.

While these devices fulfill their respective, particular objectives and requirements, the aforementioned patents do not disclose a new auxiliary vehicle windshield wiper apparatus. The inventive device includes a housing. A reciprocating motion assembly is mounted in the housing. A wiper assembly comprises an arm portion and a wiper. The arm portion has a first end and a second end. The first end of the arm portion is mounted on the reciprocating motion assembly. A wiper for wiping the windshield of the car is fixedly coupled to the second end of the arm portion. A securing means releasably secures the housing to the windshield.

In these respects, the auxiliary vehicle windshield wiper apparatus according to the present invention substantially departs from the conventional concepts and designs of the prior art, and in so doing provides an apparatus primarily developed for the purpose of acting as a back-up windshield wiper system during times of windshield wiper failure.

SUMMARY OF THE INVENTION

In view of the foregoing disadvantages inherent in the known types of windshield wipers now present in the prior art, the present invention provides a new auxiliary vehicle windshield wiper apparatus construction wherein the same can be utilized for acting as a back-up windshield wiper system during times of windshield wiper failure.

The general purpose of the present invention, which will be described subsequently in greater detail, is to provide a new auxiliary vehicle windshield wiper apparatus apparatus and method which has many of the advantages of the windshield wipers mentioned heretofore and many novel features that result in a new auxiliary vehicle windshield wiper apparatus which is not anticipated, rendered obvious, suggested, or even implied by any of the prior art windshield wipers, either alone or in any combination thereof.

To attain this, the present invention generally comprises a housing. A reciprocating motion assembly is mounted in the housing. A wiper assembly comprises an arm portion and a wiper. The arm portion has a first end and a second end. The first end of the arm portion is mounted on the reciprocating motion assembly. A wiper for wiping the windshield of the car is fixedly coupled to the second end of the arm portion. A securing means releasably secures the housing to the windshield.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new auxiliary vehicle windshield wiper apparatus apparatus and method which has many of the advantages of the windshield wipers mentioned heretofore and many novel features that result in a new auxiliary vehicle windshield wiper apparatus which is not anticipated, rendered obvious, suggested, or even implied by any of the prior art windshield wipers, either alone or in any combination thereof.

It is another object of the present invention to provide a new auxiliary vehicle windshield wiper apparatus which may be easily and efficiently manufactured and marketed.

It is a further object of the present invention to provide a new auxiliary vehicle windshield wiper apparatus which is of a durable and reliable construction.

An even further object of the present invention is to provide a new auxiliary vehicle windshield wiper apparatus which is susceptible of a low cost of manufacture with regard to both materials and labor, and which accordingly is then susceptible of low prices of sale to the consuming public, thereby making such auxiliary vehicle windshield wiper apparatus economically available to the buying public.

Still yet another object of the present invention is to provide a new auxiliary vehicle windshield wiper apparatus which provides in the apparatuses and methods of the prior art some of the advantages thereof, while simultaneously overcoming some of the disadvantages normally associated therewith.

Still another object of the present invention is to provide a new auxiliary vehicle windshield wiper apparatus for acting as a back-up windshield wiper system during times of windshield wiper failure.

Yet another object of the present invention is to provide a new auxiliary vehicle windshield wiper apparatus which includes a housing. A reciprocating motion assembly is mounted in the housing. A wiper assembly comprises an arm portion and a wiper. The arm portion has a first end and a second end. The first end of the arm portion is mounted on the reciprocating motion assembly. A wiper for wiping the windshield of the car is fixedly coupled to the second end of the arm portion. A securing means releasably secures the housing to the windshield.

Still yet another object of the present invention is to provide a new auxiliary vehicle windshield wiper apparatus that may be plugged into the vehicle power tap.

Even still another object of the present invention is to provide a new auxiliary vehicle windshield wiper apparatus that may use standard wiper blades.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
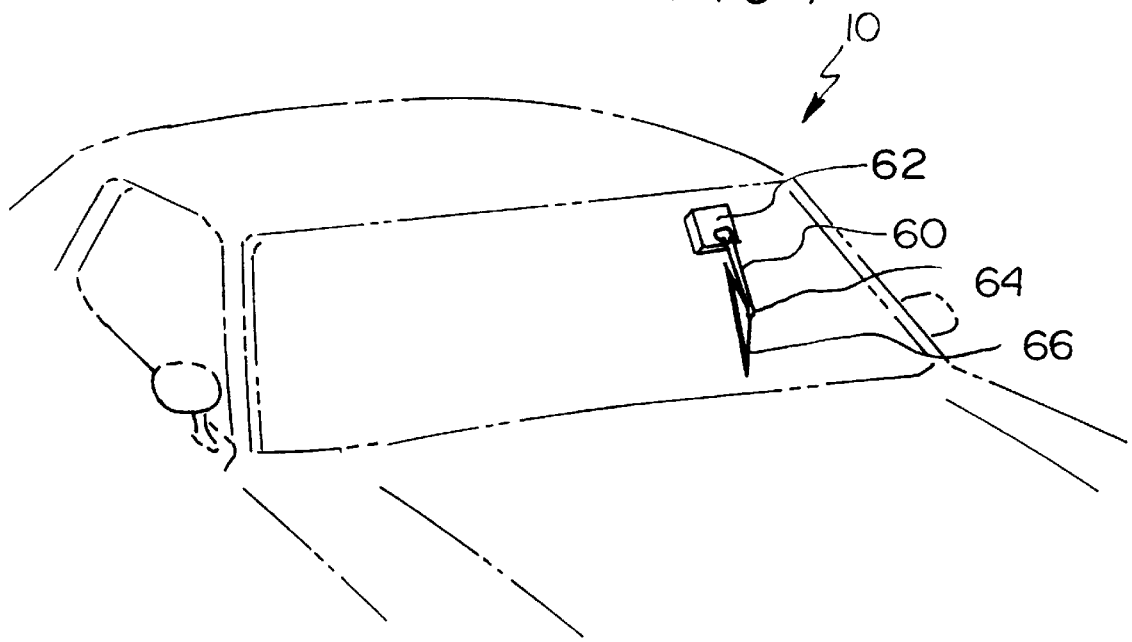
FIG. 1 is a schematic perspective view of a new auxiliary vehicle windshield wiper apparatus according to the present invention.

With reference now to the drawings, and in particular to FIGS. 1 through 4 thereof, a new auxiliary vehicle windshield wiper apparatus embodying the principles and concepts of the present invention and generally designated by the reference numeral 10 will be described.

As best illustrated in FIGS. 1 through 4, the auxiliary vehicle windshield wiper apparatus 10 generally comprises a housing 12. The housing 12 has a front wall 14, a back wall 16, and a peripheral wall 18 extending between the front and back wall. The walls of the housing have an interior surface 20 and an exterior surface 22. The front 14 and back walls 16 have a generally rectangular shape.

A reciprocating motion wiper assembly 24 is mounted in the housing 12. The reciprocating motion assembly has a disc 26, which is rotatably mounted to an interior surface 20 of the front wall 14. The disc 26 has a peripheral edge 28 having a plurality of teeth 30 therein. A surface of the disc has knob 32 thereon. The knob 32 is generally adjacent to the peripheral edge 28 of the disc.

A rod 34 has a first end 36, a second end 38 and a middle portion 40. The rod 34 is within the housing 12. The middle portion 40 has an elongate slot 42 therein. The knob 32 is slidably mounted in the slot 42. The first end 36 of the rod 34 is rotatably coupled to a bore, not shown, in the front wall 14.

A gear 44 rotates the disc 26 and is rotationally mounted in the housing 12. The gear 44 has teeth 46 thereon for communication with the teeth 30 on the disc 26.

A motor 48 turns the gear 44. The motor 48 is mounted in the housing 12 and is mechanically coupled to the gear 44.

A power supply 50 powers the motor 48. The power supply 50 is operationally coupled to the motor 48. The power supply is in the housing 12 and is preferably a plurality of batteries 52. An alternate power supply utilizes a cord 54 having a plug portion 56 thereon which is used for plugging into the vehicle power tap. The vehicle power tap is also the female portion of the cigarette lighter device in the vehicle.

An actuating means 58 turns the motor 48 on and off. The actuating means 58 is operationally coupled to the motor 48 and is mounted in the peripheral wall 18. The actuating means 58 is a switch.

A wiper assembly comprises an arm portion and wiper.

The arm portion 60 has a first end 62 and a second end 64. The first end 62 of the arm portion 60 is mounted on the reciprocating motion assembly 24, and is fixedly connected to the first end 36 of the rod 34. The front wall 14 is positioned between the arm portion 60 and the disc 26. The arm 60 is within a plane orientated generally parallel to a plane of the exterior surface of the front wall 14.

A wiper 66 for wiping the windshield of the car is fixedly coupled to the second end 64 of the arm portion 60.

Figure 2:
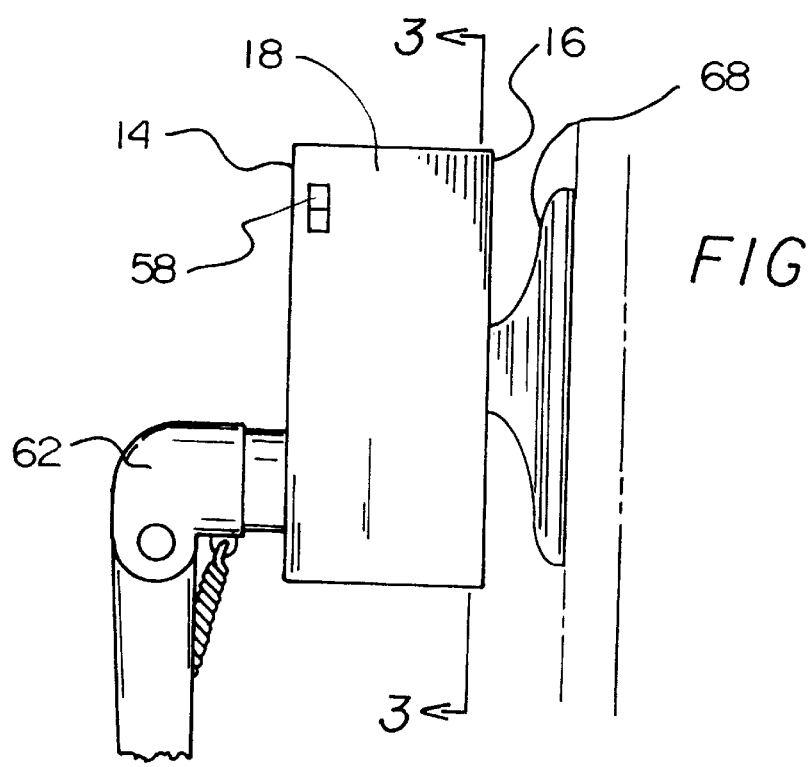
FIG. 2 is a schematic side view of the present invention.
Figure 3:
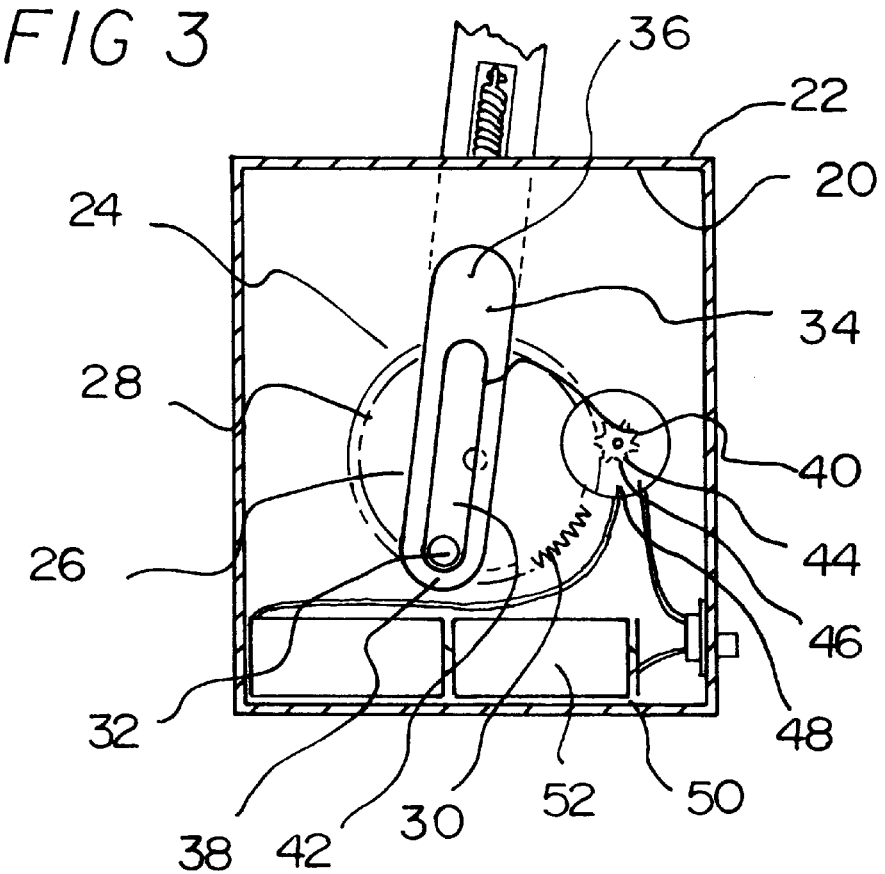
FIG. 3 is a schematic plan view of the present invention.
Figure 4:
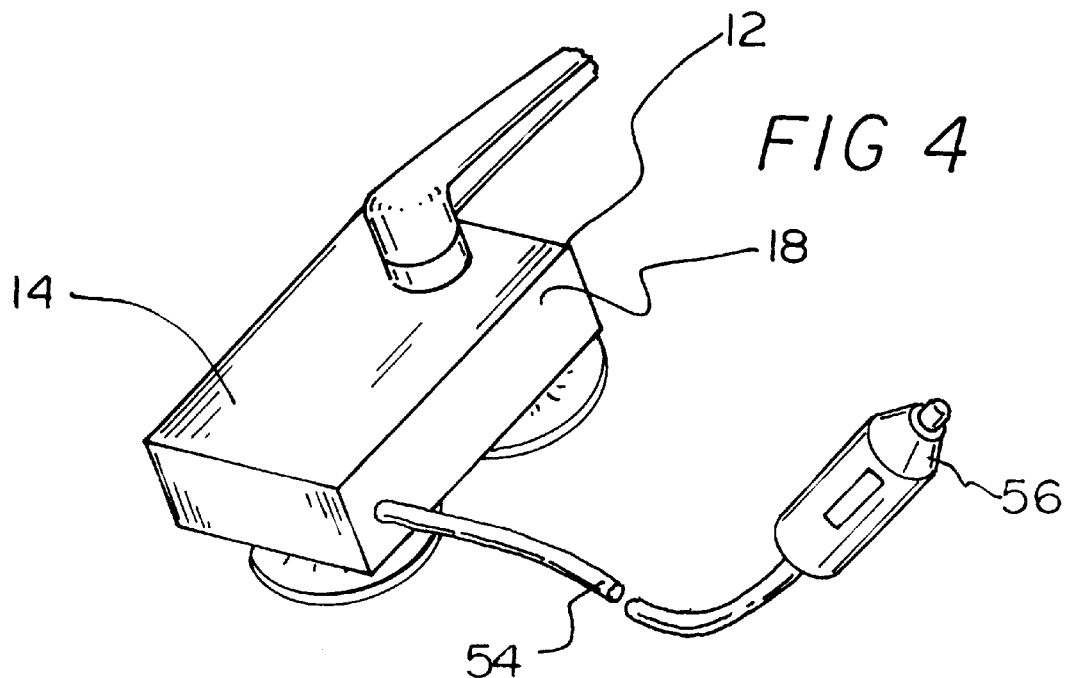
FIG. 4 is a schematic perspective view of the present invention.

A securing means 68 releasably secures the housing 12 to the windshield. The securing means 68 is fixedly coupled to the back wall 16. The securing means 68 is preferably a suction cup, and may include a plurality of suction cups. The pair of suction cups are mounted on the back wall of the housing such that both of the suction cups are positionable between the back wall of the housing and the windshield when the housing is mounted on a vehicle, such as can be seen in FIG. 1 of the drawings. Each of the first and second suction cups of the pair of suction cups has an outer perimeter, and the outer perimeter of each of said suction cups does not extend beyond the peripheral wall of said housing, such as can be seen in FIGS. 1 and 2 of the drawings.

In use, the housing is coupled to the windshield and the motor is turned on so that the wiper blade begins to move back and forth across the window.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary vehicle windshield wiper apparatus, said apparatus being removably mountable to a windshield of a vehicle, said apparatus comprising:

a housing, said housing comprising a front wall, a back wall, and a peripheral wall extending between said front and back wall, said walls of said housing having an interior surface and an exterior surface, said front and back walls having a generally rectangular shape;

a reciprocating motion assembly, said reciprocating motion assembly comprising:

a disc, said disc being rotatably mounted to an interior surface of said front wall, said disc having a peripheral edge having a plurality of teeth therein, a surface of said disc having knob thereon, said knob being generally adjacent to said peripheral edge of said disc;

a rod, said rod having a first end, a second end and a middle portion, said rod being within said housing, said middle portion having an elongate slot therein, said knob being slidably mounted in said slot, said first end of said rod being rotatably coupled to a bore in said front wall;

a gear for rotating said disc, said gear being rotationally mounted in said housing, said gear having teeth thereon for selective communication with said teeth on said disc;

a motor for turning said gear, said motor being mounted in said housing, said motor being mechanically coupled to said gear;

a power supply for powering said motor, said power supply being operationally coupled to said motor, said power supply being in said housing, said power supply being a plurality of batteries;

an actuating means for turning said motor on and off, said actuating means being operationally coupled to said motor, said actuating means being mounted in said peripheral wall, said actuating means being a switch;

a wiper assembly comprising:

an arm portion, said arm portion having a first end and a second end, said first end of said arm portion being mounted on said reciprocating motion assembly, said first end being fixedly connected to said first end of said rod, said front wall being positioned between said arm portion and said disc, said arm being within a plane orientated generally parallel to a plane of said exterior surface of said front wall;

a wiper for wiping the windshield of the car, said wiper being fixedly coupled to said second end of said arm portion; and a securing means for releasably securing said housing to the windshield, said securing means comprising a pair of suction cups mounted on the back wall of said housing such that both of said suction cups are positionable between the back wall of said housing and the windshield when the housing is mounted on a vehicle, each of said first and second suction cups having an outer perimeter, the outer perimeter of each of said suction cups does not extend beyond the peripheral wall of said housing.

* * * * *